(12) United States Patent
Centmayer et al.

(10) Patent No.: US 7,044,612 B2
(45) Date of Patent: May 16, 2006

(54) REAR VIEW MIRROR ASSEMBLY FOR VEHICLES, ESPECIALLY COMMERCIAL VEHICLES

(75) Inventors: Stephen Centmayer, Ergersheim (DE); Heinrich Lang, Ergersheim (DE); Wolfgang Seiboth, Bad Windsheim (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 10/936,060

(22) Filed: Sep. 8, 2004

(65) Prior Publication Data

US 2005/0052764 A1   Mar. 10, 2005

(30) Foreign Application Priority Data

Sep. 10, 2003  (DE) ................. 103 41 818

(51) Int. Cl.
*G02B 7/182* (2006.01)
*B60R 1/06* (2006.01)

(52) U.S. Cl. ................. 359/876; 359/877; 359/881
(58) Field of Classification Search ................ 359/841, 359/872, 873, 874, 876, 877, 881
See application file for complete search history.

(56) References Cited

U.S. PATENT DOCUMENTS

| | | | | | |
|---|---|---|---|---|---|
| 4,991,950 | A | * | 2/1991 | Lang et al. | 359/877 |
| 5,031,871 | A | * | 7/1991 | Ohta et al. | 248/544 |
| 5,110,196 | A | * | 5/1992 | Lang et al. | 359/874 |
| 5,245,480 | A | * | 9/1993 | Polzer | 359/841 |
| 5,583,703 | A | * | 12/1996 | Lang et al. | 359/877 |
| 5,604,644 | A | * | 2/1997 | Lang et al. | 359/871 |
| 5,621,577 | A | * | 4/1997 | Lang et al. | 359/872 |
| 5,687,035 | A | * | 11/1997 | Lang | 359/864 |
| 6,340,231 | B1 | | 1/2002 | Polzer | |

FOREIGN PATENT DOCUMENTS

EP   0 090 909 A2   10/1983
EP   0 306 728 B1   3/1989

\* cited by examiner

*Primary Examiner*—Ricky D. Shafer
(74) *Attorney, Agent, or Firm*—McNair Law Firm, PA; Cort Flint

(57) ABSTRACT

A rearview mirror arrangement for vehicles, in particular for utility vehicles, is disclosed which includes a mirror carrier plate 1 on which a mirror pane 11 is affixed, an adjusting unit 2 that can be attached directly to a vehicle-mounted, mirror support 4. A platform unit 22 capable of motorized rotation 23, 24 relative to a base unit 21 about at least one axis, is attached directly to the adjusting unit and a housing 3. The mirror carrier plate, as well as the housing, is thus attached directly to the platform unit and rotates with the platform unit.

18 Claims, 1 Drawing Sheet

REAR VIEW MIRROR ASSEMBLY FOR VEHICLES, ESPECIALLY COMMERCIAL VEHICLES

BACKGROUND OF THE INVENTION

This invention is directed to an adjustable rearview mirror for vehicles, in particular a motorized adjustable rearview mirror for vehicles.

In order to adjust outer mirrors in vehicles two basic concepts are generally known: According to one, a mirror carrier plate with a mirror pane secured to the carrier plate can be rotated relative to a housing surrounding the plate by a motorized adjustment unit. In this case, the housing by which the carried plate is carried remains fixed relative to a mirror support mounted to the vehicle. Rearview mirror arrangements of this type are described e.g. in EP 0 449 056 B1.

According to the second concept, the mirror carrier plate is rotated together with the housing relative to the support on the vehicle. This rearview mirror arrangement is known, e.g. from EP 0 306 728 B1. In this case, as for most rearview mirror arrangements according to this concept, a base plate is attached to a vehicle mounted mirror support. The mirror is secured to the housing and an adjustment unit connects the base plate to the housing. The adjustment unit rotates the housing together with the mirror pane relative to the base plate and the mirror support. The height of the housing required to receive the base plate and the adjustment unit is a disadvantage with such an arrangement. It increases not only weight and wind resistance, but also restricts the field of vision. EP 0 090 909 A2 therefore proposes to attach the adjustment unit directly, i.e. without interposed base plate, to the support on the vehicle to solve the problem. However, even with this rearview mirror arrangement, the mirror pane is attached directly to the housing causing several disadvantages. Because the mirror pane is attached directly to the housing, the mirror must be replaced if the housing is replaced, and vice-versa. With the mirror affixed directly to the housing the field of vision cannot be adjusted initially by aligning the adjustment unit in a suitable position on the vehicle support and adjusted by attaching the housing to the properly aligned mirror support.

In addition, vibrations of the housing which is usually made of stiff, thin plastic, and has therefore poorly attenuated natural frequencies, are generated in the course of operating the vehicle. The vibrations are transmitted directly to the mirror pane attached to the housing, causing undesirable distortions of the mirror image and damage to the mirror pane attachment, which is usually in the form of an attachment by adhesive, and damage to a mirror heater that may be installed directly under the mirror pane. Finally, the housing must also be given sufficient stability in order to bear the weight of the mirror pane together with possibly a glass supporting plate and mirror heater. This produces greater weight and volume and also restricts the freedom of configuring the unit in view of aerodynamic and esthetic considerations.

Accordingly, an object of the present invention is to provide a rearview mirror arrangement which may be adjusted as a unit with the housing, yet the vibrations of the housing are not transmitted to the mirror pane and the housing and mirror pane may be replaced individually.

SUMMARY OF THE INVENTION

The above objectives are accomplished according to the present invention by providing an adjustable rearview mirror arrangement for attachment to a vehicle-mounted mirror support comprising a platform unit, and a mirror carrier plate carried by the platform unit with a mirror pane affixed to the carrier plate. A mirror adjusting unit includes a base for attachment to the vehicle-mounted mirror support; and an adjustment shaft about which said mirror pane is adjusted relative to the vehicle. The platform unit is operatively connected to the adjustment shaft for rotation relative to said vehicle about at least one axis. A motor drive is carried by the platform unit operatively connected to said adjustment shaft for rotating the platform unit. A housing is carried by the platform unit with the mirror carrier plate also being carried by said platform unit so that the housing generally encloses the platform unit and the mirror carrier plate. In this manner, the mirror pane may be adjusted by movement of the platform unit as rotated by the adjustment unit, and one of the mirror pane and the housing may be replaced without replacement of the other.

Since the mirror carrier plate, with the affixed mirror pane, is attached directly to the adjusting unit by a platform, acting as an attenuating element massive in design which does not vibrate much, the vibrations of the housing are not transmitted directly to the mirror pane. Not only is the mirror image improved, but the housing can be configured much more freely, since it no longer has to support the mirror pane directly.

Furthermore the housing and the mirror pane can now be mounted or replaced separately. This makes it possible to attach the adjusting unit with pre-mounted mirror pane on the support on the vehicle first to position the arrangement so as to obtain the desired field of vision. That is, attachment may be made in a neutral position or in a maximum excursion position of the adjusting unit to control the field of vision in the mirror pane. The housing can then be installed to cover possible adjustment by operation of the adjusting unit to achieve positioning. For this purpose, the base of the adjusting unit can be attached in any desired position on the mirror support attached to the vehicle. In that case, the attachment can be a known form of friction or clamp connection on the support. The adjusting unit may comprise a counterpart that attaches the base on the support by clamping. Regarding the attachment of the base, as well as concerning the adjusting unit, any suitable attachment means and adjusting unit may be utilized such as that shown in EP 0 090 909 A2 or EP 0 306 728 B1, and the contents of these disclosures are expressly incorporated into the disclosure of the present invention by reference. It is also possible to attach the mirror carrier plate and/or the housing permanently, in particular by means of rivets and/or by bonding to the platform unit.

The adjusting unit can also be rotatable around two axes relative to the base, in particular axes that are perpendicular relative to each other. It may also comprise one or more motors that can be adjusted preferably by the driver by means of switches. Electrical motors controlled by means of electrical lines or remote control are especially preferred. This advantageously enables the driver to adjust the field of vision of the mirror in at least one plane in the drive position.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
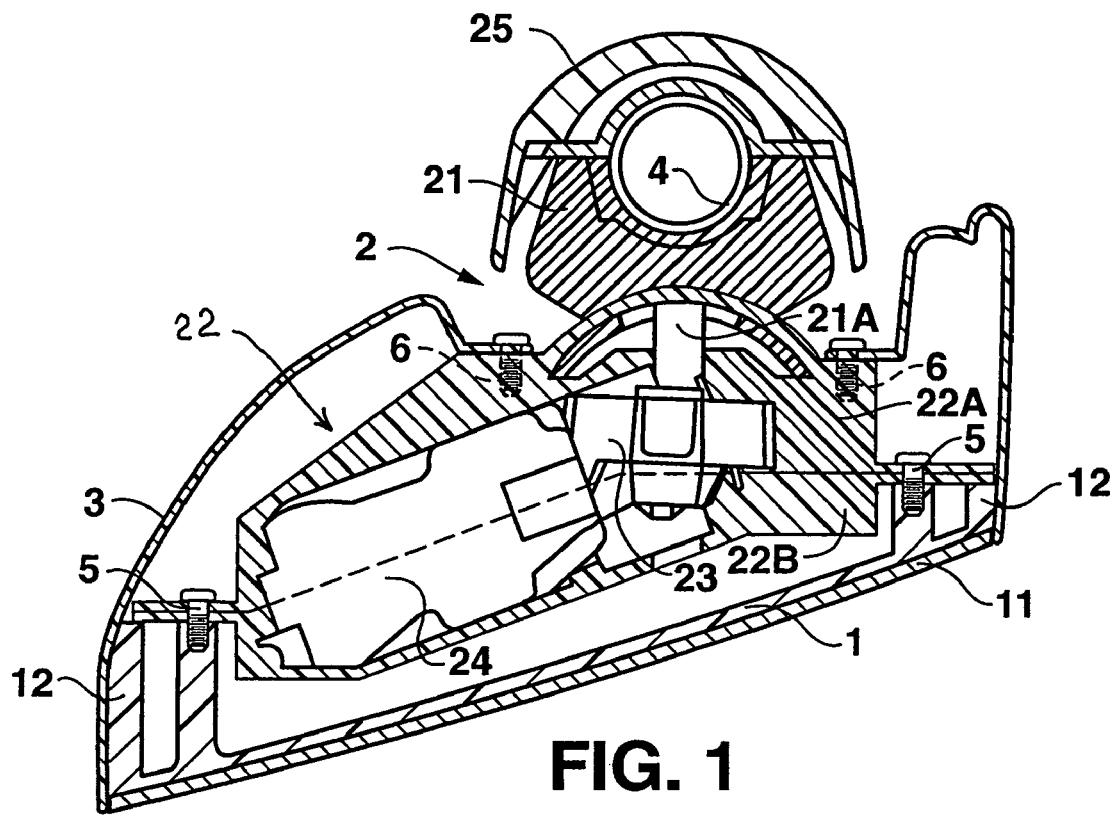
FIG. 1 shows a rearview mirror arrangement according to a first embodiment of the present invention in section.

Referring now to the drawings, the invention will now be described in more detail.

A rearview mirror arrangement according to a first embodiment of the present invention comprises a mirror adjusting unit 2 having a base 21. A platform unit 22 is rotatably attached to base 21 by means of an adjustment shaft 21A. The platform unit can be rotated relative to the base 21 by means of a drive motor arrangement including two electric servo motors 23 or 24, geared to adjustment shaft 21A, about the axes perpendicular to each other in a conventional manner. The servo motors 23 or 24 are actuated by the driver by means of switches or similar devices connected to the servo motors via control lines (not shown). The servo motors as well as the structure of the adjusting unit, inclusive of a possible gear, are known from the state of the art and are therefore indicated here only schematically. It can be seen from FIG. 1 that the platform unit in the preferred design is in two parts 22A and 22B in order to receive the motors 23, 24, and is assembled by means of screws 5.

Base 21 of adjusting device 2 is attached to a vehicle-mounted mirror support 4 affixed to a vehicle (not shown) by a counterpart 25 braced against base 21 to clamp the support 4 therebetween in a frictional connection. Clamping may be provided, for example, by connecting the counterpart 25 interlockingly to the base 21. An opening is formed between the base and counterpart being smaller than support 4. Support 4, placed in this opening, deforms the counterpart 25 elastically so that it is braced against the base and at the same time clamps the support. The rearview mirror arrangement can thus advantageously be initially fixed in any desired angular position relative to the rotationally symmetrical support 4.

In a variation of the present invention counterpart 25 can be attached to base 21 by at least two screws on opposite sides of the support 4, whereby an opening is provided between the counterpart and base that is smaller than the support 4 when the screws are fully screwed in. Different methods of attachment, e.g. screwing, bonding, snapping into suitably configured snap-in connections, can also be used.

A mirror carrier plate 1 is attached directly to the platform unit 22 by means of screws 5. A mirror pane 11 is secured to mirror carrier plate 1 by adhesive bonding, and the like. A mirror heater can be provided between the mirror pane and the mirror carrier plate if desired.

A housing 3 is also attached directly to platform unit 22 by means of screws 6. The housing is designed so that when the housing, platform unit, and carrier plate are assembled, protrusions 12 carried by the mirror carrier plate close between the carrier plate and housing over their entire circumference. This prevents dirt or moisture from reaching the interior of the rear-view mirror arrangement which might affect the adjusting unit 2 and, in particular, the motors 23, 24, in operation. In the same manner the housing 3 may also be adhered to the mirror pane 11 directly, i.e. without protrusions 12. However the protrusions 12 further stabilize the housing. As a seal and/or to attenuate vibrations, sealing means, e.g. a surrounding rubber seal, [not shown] can be provided on the inside circumference between the protrusions 12.

Figure 2:
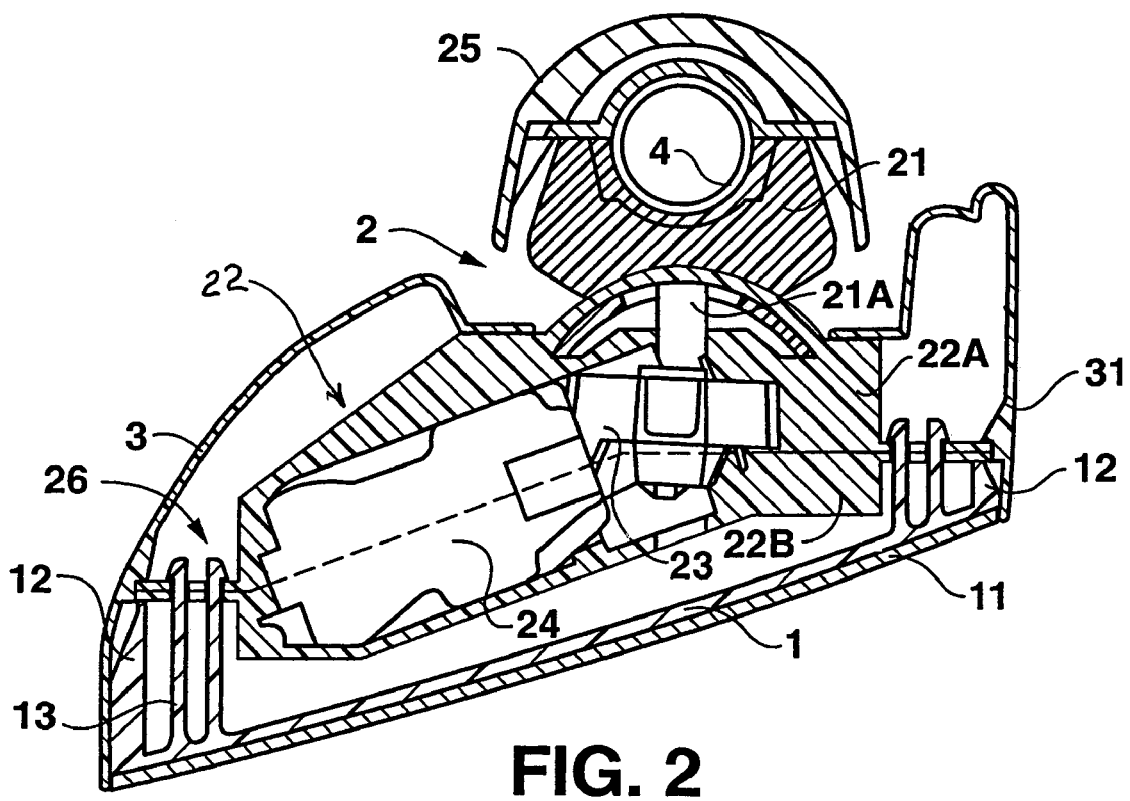
FIG. 2 shows a rearview mirror arrangement according to a second embodiment of the present invention in section.

FIG. 2 shows a rearview mirror arrangement according to a second embodiment of the present invention. It is different from the first embodiment in that the mirror carrier plate 1 as well as the housing 3 is attached to the platform unit 22 by clip-on fasteners. For this purpose the mirror carrier plate 1 is provided with first releasable fastening elements or clips 13 that snap into the correspondingly configured openings 26 of the platform unit in an interlocking manner. Fastening clips 13 and projections 12 of the mirror carrier plate are designed in such a manner in this case that they are elastically deformed to a slight degree as the fastening clips 13 snap into the openings 26 and thus fix the mirror carrier plate and the platform unit to each other. Similarly, the housing 3 is provided with second releasable fastening elements or clips 31 that engage platform unit 22 in an interlocking manner, so that housing and platform are fixed to each other. Such clip connections, known from the state of the art, make it advantageously possible to install and uninstall the housing and the platform unit to each other.

While a preferred embodiment of the invention has been described using specific terms, such description is for illustrative purposes only, and it is to be understood that changes and variations may be made without department from the spirit or scope of the following claims.

What is claimed is:

1. An adjustable rearview mirror arrangement for vehicles wherein the mirror arrangement is attached to a vehicle-mounted mirror support, said mirror arrangement comprising:
    a mirror carrier plate;
    a mirror pane carried by said carrier plate;
    an adjusting unit for adjusting the mirror pane relative to the vehicle having a base for attachment directly to said mirror support;
    a platform unit operatively connected to said adjusting unit for rotation relative to said base;
    a drive motor carried by said platform unit operatively connected to said adjusting unit for rotating said platform unit about at least one axis;
    said mirror carrier plate and the mirror pane being carried by said platform unit; and
    a housing carried by said platform unit and said mirror carrier plate being carried by said platform unit so that said housing generally encloses said platform unit and said mirror carrier plate;
    whereby said mirror pane may be adjusted by movement of the platform unit as rotated by said adjusting unit with said platform unit effectively isolating said mirror pane from housing vibrations.

2. The arrangement of claim 1 wherein said platform unit may be rotated about at least two axes relative to said base.

3. The arrangement of claim 1 wherein said base of said mirror adjusting unit can be attached to the mirror support on the vehicle in any desired position to provide an initial mirror adjustment.

4. The arrangement of claim 3 including one of an interlocking connection and a frictional connection for attaching the base of said adjusting unit to said mirror support on the vehicle.

5. The arrangement of claim 3 including a counterpart cooperating with said base to attach said adjusting unit to said mirror support on the vehicle.

6. The arrangement of claim 1 including releasable fastening elements for securing said mirror carrier plate and said housing to said platform unit.

7. The arrangement of claim 1 wherein said mirror carrier plate and housing are attached by a non-releasable fastening means to the platform unit.

8. An adjustable rearview mirror arrangement for vehicles wherein the mirror arrangement is attached to a vehicle-mounted mirror support, said mirror arrangement comprising:
a platform unit;
a mirror carrier plate detachably carried by said platform unit;
a mirror pane affixed to said carrier plate;
a mirror adjusting unit for adjusting the position of said mirror pane;
said mirror adjusting unit having a base for attachment to the vehicle-mounted mirror support about which said mirror pane is adjusted relative to the vehicle about two axes;
said platform unit operatively connected to said adjusting unit for rotation relative to said vehicle about said two axes;
a motor drive carried by said platform unit for rotating said platform unit about two axes relative to said vehicle; and
a housing detachably carried by said platform unit and said mirror carrier plate being carried by said platform unit so that said housing generally encloses said platform unit and said mirror carrier plate;
whereby said mirror pane may be adjusted by movement of the platform unit as rotated by said adjusting unit, and one of said mirror pane and said housing may be replaced without replacement of the other.

9. The arrangement of claim 8 wherein said motor drive is geared with an adjustment shaft of said adjusting unit.

10. The arrangement of claim 8 wherein said base of said mirror adjusting unit can be attached to the mirror support on the vehicle in any desired position to provide an initial mirror adjustment.

11. The arrangement of claim 10 including a counterpart cooperating with said base to attach said adjusting unit to said vehicle-mounted mirror support.

12. The arrangement of claim 8 including releasable fastening elements for securing said mirror carrier plate to said platform unit, and for securing said housing to said platform unit so that the housing and the mirror pane may be replaced.

13. The arrangement of claim 8 wherein said adjusting unit is connected directly to said platform unit.

14. An adjustable rearview mirror arrangement for vehicles wherein the mirror arrangement is attached to a vehicle-mounted mirror support, said mirror arrangement comprising:
a platform unit;
a mirror carrier plate carried by said platform unit;
a mirror pane affixed to said carrier plate;
a mirror adjusting unit having a base for attachment to the vehicle-mounted mirror support;
said mirror adjusting unit having an adjustment shaft about which said mirror pane is adjusted relative to the vehicle about at least one axis;
said platform unit operatively connected to said adjustment shaft for rotation relative to said vehicle about said at least one axis; and
a motor drive carried by said platform unit operatively connected to said adjustment shaft for rotating said platform unit about at least one axis;
a housing carried by said platform unit generally enclosing said platform unit and said mirror carrier plate, and said platform unit effectively isolating said mirror carrier plate with the mirror pane affixed to prevent transmission of vibrations from said housing to said mirror pane.
whereby said mirror pane may be adjusted by movement of the platform unit as rotated by said adjusting unit.

15. The arrangement of claim 14 wherein said motor drive is geared to said adjustment shaft and includes two motors for rotating said mirror carrier plate about two axes for adjusting the position of said mirror pane.

16. The arrangement of claim 14 including an adjustable attachment for attaching said base of said mirror adjusting unit to the vehicle-mounted mirror support in desired position to provide an initial mirror adjustment, wherein said adjusting unit provides for further mirror adjustment.

17. The arrangement of claim 14 wherein said platform unit is directly connected to said adjustment shaft.

18. The arrangement of claim 14 including first releasable fastening elements for detachably securing said mirror carrier plate to said platform unit, and second releasable fastening elements for detachably securing said housing to said platform unit so that one of said housing and the mirror pane may be replaced without replacement of the other.

* * * * *